Patented Mar. 2, 1926.

1,574,854

UNITED STATES PATENT OFFICE.

MICHIHIKO TSUBATA, OF TACHIBANA-GORI, JAPAN.

METHOD OF PREPARING A PAINTING MATERIAL OF POWDER FORM FOR USE WITH EITHER WATER OR OIL.

No Drawing. Application filed July 24, 1923. Serial No. 653,587.

*To all whom it may concern:*

Be it known that MICHIHIKO TSUBATA, subject of the Emperor of Japan, residing at No. 1444 Aza Namamugi, Tsurumi-machi, Tachibana-gori, Kanagawa Prefecture, Japan, has invented certain new and useful Improvements in a Method of Preparing a Painting Material of Powder Form for Use with Either Water or Oil, of which the following is a specification.

This invention consists in a method of manufacturing a painting material of powder form to be used with either water or oil, including a step of drying and powdering a mass obtained by mixing pigments for drying oils with gelatin or casein, or both of them, formalin, and alcohol or a similar solvent, and a step of kneading, drying and powdering a mixture of the powder above produced with gelatin or casein or both of them, drying oils and alcohol or a similar solvent. The object of the invention is to obtain a painting material which is capable of use with either water or oils, and in either case, every particle of the pigment used is firstly covered by a film of a water proof material resulting from the gelatin and formalin which is in turn covered by a plastic gelatinous material, so that the colour of the pigment is very durable and can be practically permanently kept unchanged.

The fact of mixing a pigment with gelatin in the manufacture of water colour painting material, and also the fact of mixing pigment with drying oil in the manufacture of oil painting materials, are already known prior to this invention. But there is no kind of painting materials which can be equally used as oil painting materials as well as water colour painting materials. This invention supplies a superior product which is suitable for both painting materials and also is excellently durable.

According to the first step of this invention, gelatin or casein, or both of them, formalin and alcohol or a similar solvent are mixed with one or more of pigments for drying oils and this mixture is dried and powdered. In the second step, this powder is mixed with gelatin or casein or both of them, drying oils and alcohol or a similar solvent, and this mixture is well kneaded, dried and powdered. Here, gelatin can be substituted by colloidal materials such as glue, isinglass, or other gelatinous substances. As drying oils I may use one or more of the following oils: wood oil, poppy seed oil, linseed oil, perilla oil and any of the boiled oils. The oils used may be mixed with one or more of the following substances: shellac varnish, Canada balsam, cocoa oil, vaselin, castor oil and similar substances to adjust their viscosity. The mineral pigments may be such as ultramarine, verdigris, vermilion, zinc oxide, white lead, white wash, or one or more of animal pigments such as, cochineal, bone black, or one or more of vegetable pigments such as shikon (a colouring matter in japan) or indigo. For the alcohol I employ either methyl or ethyl alcohol but any other equivalent organic solvent may be used.

Now explaining the mutual effects of the constituents of the painting material according to this invention, casein is mixed with gelatin for the purpose of adjusting the viscosity of the latter. To mix drying oil with gelatin, is to give the product the property of its becoming painting material for oil painting as well as for water colour painting, since by the presence of gelatin it is miscible in water, and by the presence of drying oil, it is also miscible in oil. Formalin acts upon gelatin and thereby produces a water proof substance. This covers the particles of the pigments and gives the latter an excellent durability to resist the oxidation or other destructive action of the atmosphere and to keep the fresh colour of the pigment. This covering, however, is somewhat viscous and therefore gives the product some adhering tendency. The purpose of using alcohols is to destroy such tendency and when kneaded with alcohols, it entirely becomes non-adhesive. Thus in the first step of the process, the particles of the pigment are covered by a film of a water proof material of gelatin and formaldehyde so that they are prevented from directly touching with the atmosphere to keep the original colour permanently. But by the use of the first step only, the product can not become what is used as painting material for oil as well as for water. This is achieved by the second step whereby the particles are further covered by gelatinous materials, so that the product is easily miscible either in oil or in water. The water mixture of this product will not penetrate even on unsized paper, and very fine lines can be drawn on such paper.

Examples.

*The first step.*—100 parts of gelatin with or without addition of 5 parts of casein, is heated with 450 parts of water. Then 25 parts of poppy seed oil with or without the addition of 0.5 parts of shellac may preferably be added and the mixture is agitated until it becomes in an emulsion state. If desired, for the purpose of obtaining good admixture of gelatin with the oil, its solution in 50 parts of gasoline or turpentine may be used.

50 parts of the above emulsionized liquid is kneaded with a pigment, say 62.5 parts of zinc oxide or other pigment mentioned above, and is again kneaded with the addition of 2.5 parts of 2% water solution of formalin, and further kneaded with the addition of 12.5 parts of ethyl alcohol. The final product is a non-adhesive mass and this is washed with water, filtered, dried and made into powder. This product of the first step may become water colour painting material when gelatin and water are added and oil painting material when dry oil is added.

*The second step.*—100 parts of gelatin with or without the addition of 5 parts of casein is heated with 450 parts of water, and this is emulsionized with the addition of poppy seed oil with or without the addition of 0.5 parts of shellac. If desired, the purpose of obtaining good admixture of gelatin with the oil, its solution in 50 parts of gasoline or turpentine may be used.

50 parts of this emulsionized liquid is mixed to the whole parts of the powdered product of the first step and kneaded and then 20 parts of ethylalcohol is added. The mixture is well kneaded, dried and made into powder form to obtain the final product.

It will be understood that, the kinds of the raw materials employed for the process, their combination and percentages may be modified and interchanged without departing from the scope of the invention. Although I have used the word gelatin in the claim I do not intend to restrict myself to the substance of that name but intend to include thereby not only that substance but also such substances as glue, isinglass and other similar colloidal and gelatinous substances either individually or in admixture.

Having now particularly described and ascertained the nature of my said invention and in what manner the same is to be performed, I declare what I claim is:

The process of manufacturing a painting material of powder form capable of use either with water or oil, comprising the step of drying and powdering a mass comprising pigments for drying oils, gelatin formalin and alcohol and the step of mixing, drying and powdering the mixture of the powder above produced with a mixture comprising gelatin, drying oil and alcohol.

In testimony whereof I affix my signature.

MICHIHIKO TSUBATA.